United States Patent [19]
Bourguet et al.

[11] 4,087,726
[45] May 2, 1978

[54] CONSTANT-FREQUENCY CURRENT CHOPPERS FOR LOW-RATE SUPPLY OF AN INDUCTIVE LOAD

[75] Inventors: Alain P. Bourguet, Montmorency; Philippe L. Gantois, Noisy le Sec, both of France

[73] Assignee: Jeumont-Schneider, Puteaux, France

[21] Appl. No.: 707,710

[22] Filed: Jul. 21, 1976

[30] Foreign Application Priority Data

Aug. 7, 1975   France ................................ 75 24671

[51] Int. Cl.² .............................................. H02P 5/16
[52] U.S. Cl. ........................... 318/345 G; 307/252 M; 363/124; 363/135
[58] Field of Search ................. 318/345 G; 321/45 C; 307/252 M

[56] References Cited

U.S. PATENT DOCUMENTS

| | | | |
|---|---|---|---|
| 3,629,673 | 12/1971 | Thorboro | 321/45 C |
| 3,659,119 | 4/1972 | Kasama et al. | 321/45 C |
| 3,379,955 | 4/1968 | Koetsch | 321/45 C |
| 3,761,793 | 9/1973 | Naito | 318/345 G |

FOREIGN PATENT DOCUMENTS

| | | | |
|---|---|---|---|
| 2,226,040 | 2/1973 | Germany | 307/252 M |
| 2,112,826 | 10/1972 | Germany | 307/252 M |
| 1,051,629 | 12/1966 | United Kingdom | 307/252 M |

*Primary Examiner*—David Smith, Jr.
*Attorney, Agent, or Firm*—Bacon & Thomas

[57] ABSTRACT

In a constant frequency chopper for low-rate supply for an inductive load, a cut-off capacitor discharge circuit is added which shunts the cut-off capacitor and which, when the motor is required to operate at a low rate, helps to bypass the excess energy stored in the cut-off capacitor.

11 Claims, 5 Drawing Figures

CONSTANT-FREQUENCY CURRENT CHOPPERS FOR LOW-RATE SUPPLY OF AN INDUCTIVE LOAD

The invention is for an improvement in or relating to constant-frequency current choppers for low-rate supply for an inductive load.

Choppers can of course be embodied inter alia by a main thyristor shunted by a cut-off thyristor in series with a cut-off capacitor, the same being shunted by a charge-reversing circuit usually comprising a third thyristor in series with an inductance.

Such choppers are powered by a constant-voltage d.c. supply and are usually used to supply variable voltage to a d.c. motor connected in series with a smoothing choke. At times when the motor power is interrupted by the chopper, the motor and the smoothing inductance can discharge by way of a freewheel diode the energy they had stored during the previous period when they were being supplied by the chopper.

If the chopping frequency is constant — i.e., if the cycles of chopper operation recur periodically at a constant frequency - the known choppers cannot provide low-rate operation — i.e., at rates of from a few percent to a few tens of percent of the rated motor current - because the motor receives the energy stored in the cut-off capacitor when the cut-off circuit operates — i.e., when the corresponding thyristor and capacitor operate.

This improvement helps to obviate this disadvantage by adding to the chopper a cut-off capacitor discharge circuit which shunts the cut-off capacitor and which, when the motor is required to operate at a low rate, helps to bypass the excess energy stored in the cut-off capacitor.

Another advantage of the invention is that the potentials at points of the chopper can be determined in transient conditions to provide satisfactory chopper operation.

The improvement in or relating to current choppers according to the invention is of use with choppers devised as hereinbefore outlined and is distinguished by the addition to the known chopper used of the following items:

A first inductance connected in series with the chopper part comprising the cut-off capacitor and associated charge-reversing circuit;

A capacitor-discharging circuit comprising a first resistance in series with a first diode and connected across the previous system, the first diode being of opposite polarity to the cut-off thyristor;

A second inductance disposed in the chopper output connection;

A decoupling circuit comprising two parallel branches, one branch comprising a capacitor in series with a second resistance, the other branch comprising a third resistance in series with a second diode, the decoupling circuit being connected between, on the one hand, the connection connecting the first inductance to the first resistance and, on the other hand, that terminal of the d.c. power supply for the chopper which is not connected to the chopper input, the second diode being of opposite polarity to the latter power supply;

A control logic which, when the inductive load current is required to be between a few percent and a few tens of percent of its rated value, turns on the cut-off thyristor during the conductive times of the first diode, the energy supplied to the inductive load being proportional to the time difference between the turning-on of the cut-off thyristor and the natural cut-off of the first diode, and which also, when the inductive load current is greater than the values just specified, turns the main thyristor on, then turns it off by turning the cut-off thyristor on, as is conventional in the control of current choppers.

The invention will be more clearly understood if reference is made to two embodiments described hereinafter and to the two accompanying sheets of drawings wherein.

Figure 1:
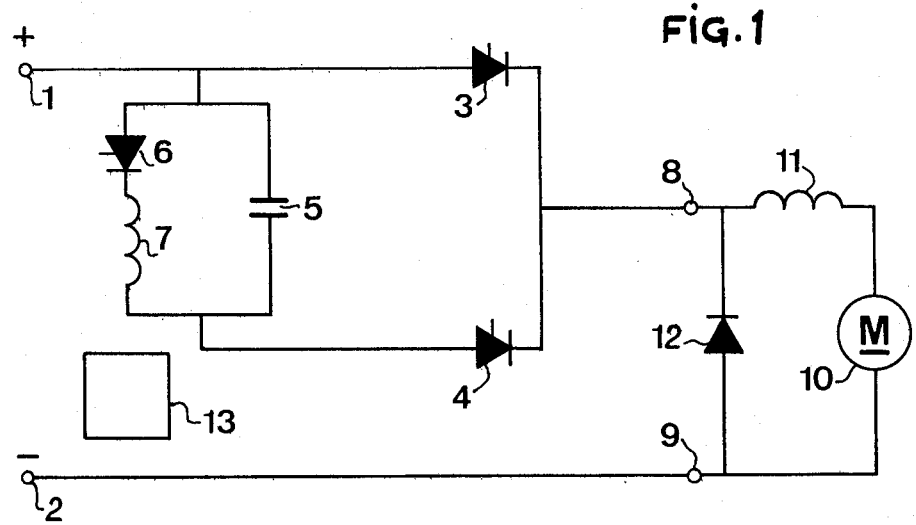
FIG. 1 shows a circuit diagram for a known current chopper supplying a d.c. motor.

Referring to FIG. 1, a constant-voltage d.c. supply energises by way of terminals 1, 2 a known chopper embodied by a main thyristor 3 and a cut-off thyristor 4 in series with a circuit comprising two parallel branches, one branch comprising a cut-off capacitor 5 while the other branch comprises a reversal thyristor 6 in series with a reversal choke 7. The chopper embodied by the integers 3 – 7 supplies by way of its terminals 8, 9 (terminal 9 being connected to the negative terminal 2 of the power supply) an inductive load which in the example selected takes the form of a d.c. motor 10 in series with a smoothing choke 11, the whole being shunted by a freewheel diode 12.

A control logic 13 pilots the chopper thyristors 3, 4, 6.

Figure 2:
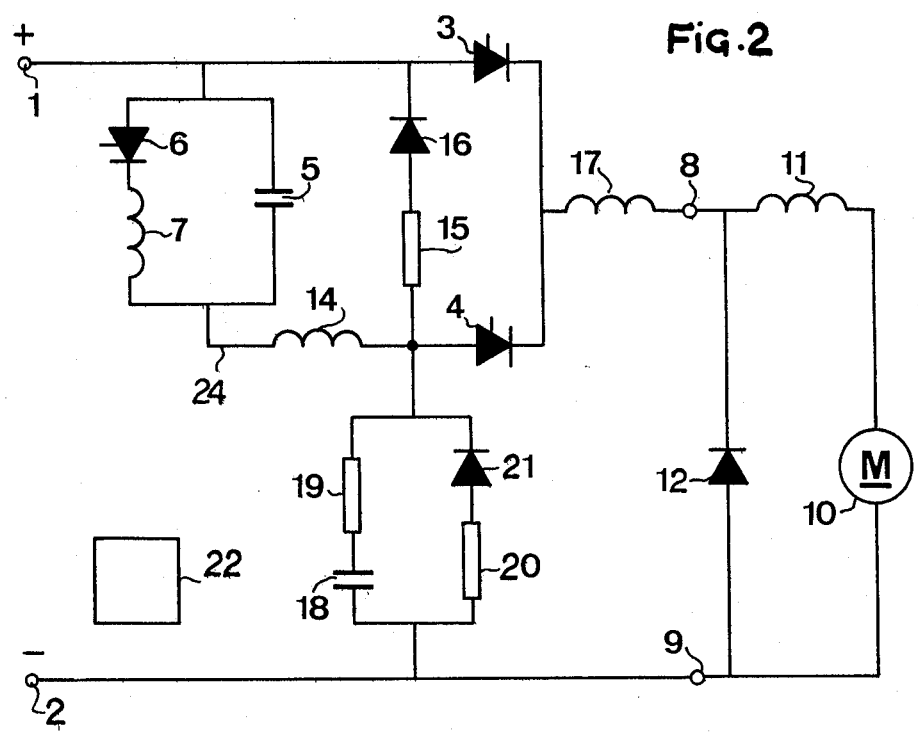
FIG. 2 shows the circuit diagram of a first embodiment of the invention for supplying a d.c. motor.

FIG. 2 includes the same items as FIG. 1, like references denoting like items. The added new items according to the invention are the following:

a. A choke 14 is connected in series with that part of the chopper comprising the elements 5 – 7, on that side thereof which is remote from the positive terminal 1 forming the chopper input — i.e., in the particular case shown in FIG. 2 the choke 14 is connected in series with thyristor 4 on the anode side thereof;

b. A resistance 15 and a diode 16 are so connected in series with one another between the anodes of thyristors 3 and 4 that the cathode of diode 16 is connected to the anode of thyristor 3;

c. A choke 17 is disposed between the chopper output — i.e., the interconnected cathodes of thyristors 3, 4 — and the terminal 8;

d. A decoupling circuit is connected between terminal 2 (or 9) and the anode of thyristor 4 and comprises two parallel branches, one branch comprising a capacitor 18 in series with a resistance 19 while the other branch comprises a resistance 20 in series with a diode 21, the cathode thereof being connected to the anode of thyristor 4. The function of the decoupling circuit is to prevent over-rapid variation of the voltages applied to the thyristors and to limit the charge of capacitor 5, and e. A control logic 22 pilots the chopper thyristors 3, 4, 6.

To provide currents of gradually increasing strength in motor 10, logic 22 operates consecutively in the following two manners:

1. When the motor current is required to be low — i.e., between a few percent and a few tens of percent of its rated value — the logic 22 turns the thyristor 4 on during the conductive times of diode 16, the energy supplied to the motor being proportional to the time difference between the turning-on of thyristor 4 and the natural cut-off of diode 16, and 2. When the motor current 10 is greater than the values just mentioned, the logic 22 turns the thyristor 3 on, then turns it off by turning on thyristor 4, a form of control which is familiar with current choppers.

A more detailed description will now be given of how the chopper operates.

Figure 4:
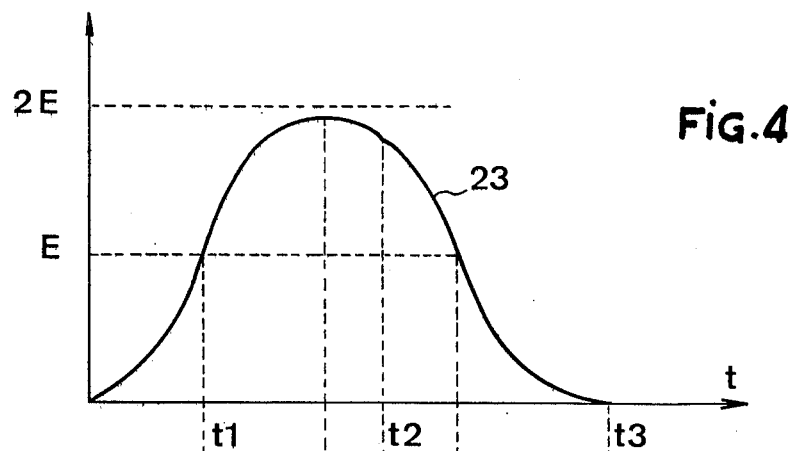
FIG. 4 is a graph showing voltage variation plotted against time at one of the significant points or places in the diagram of FIG. 2.

In the case of operation (1), the capacitor 5 charged by the d.c. supply through choke 14 and the decoupling circuit 18 - 21 discharges through choke 7 when thyristor 6 is turned on. Since capacitor 5 and choke 7 form a resonant circuit, the charge of capacitor 5 reverses. Curve 23 in FIG. 4 shows the voltage variations in time during such charge reversal at the connection 24 between the choke 14 and the capacitor 5 and choke 7 of FIG. 2, E denoting the d.c. supply voltage.

Figure 5:
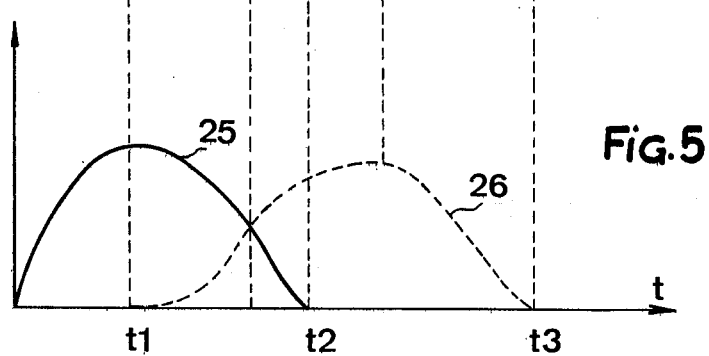
FIG. 5 is a graph showing current variation plotted against time in the reversal thyristor and in the first diode of the diagram of FIG. 2.

Curve 25 in FIG. 5 shows the current variation plotted against time in thyristor 6 of FIG. 2, and a chain-line curve 26 represents the corresponding current variation for the diode 16.

When the voltage at connection 24 reaches the value E — i.e., at the time $t1$ — diode 16 becomes conductive and discharges capacitor 5, the charge thereof being reversed through the agency of choke 14 and resistance 15. Upon completion of the charge reversal of capacitor 5 — i.e., at a time $t2$ — thyristor 6 ceases to conduct. Capacitor 5 continues to discharge via the circuit containing the diode 16 until the voltage at the connection 24 becomes equal to the voltage of terminal 2 — i.e., until a time $t3$ - whereafter the diode 16 ceases to conduct.

If thyristor 4 is turned on at an instant of time between the times $t1$ and $t3$, some of the energy stored in capacitor 5 and the chokes 7, 14 is bypassed through the motor 10. As the turning on time of thyristor 4 is shifted from $t3$ to $t1$, the current which the motor 10 receives in this way gradually increases; if the thyristor 4 is turned on near the time $t3$, the motor current can be controlled down to a few percent of its rated value.

In the case of operation (2), to increase the motor current 10 beyond the value obtained by turning the thyristor 4 on at the time $t1$, conventional chopper operation is reverted to by turning the thyristor 3 on before the thyristor 4, the same still being turned on at the time $t1$. As the time interval between the turning-ons of thyristors 3 and 4 is increased, the motor current can gradually be increased up to the permissible maximum.

Figure 3:
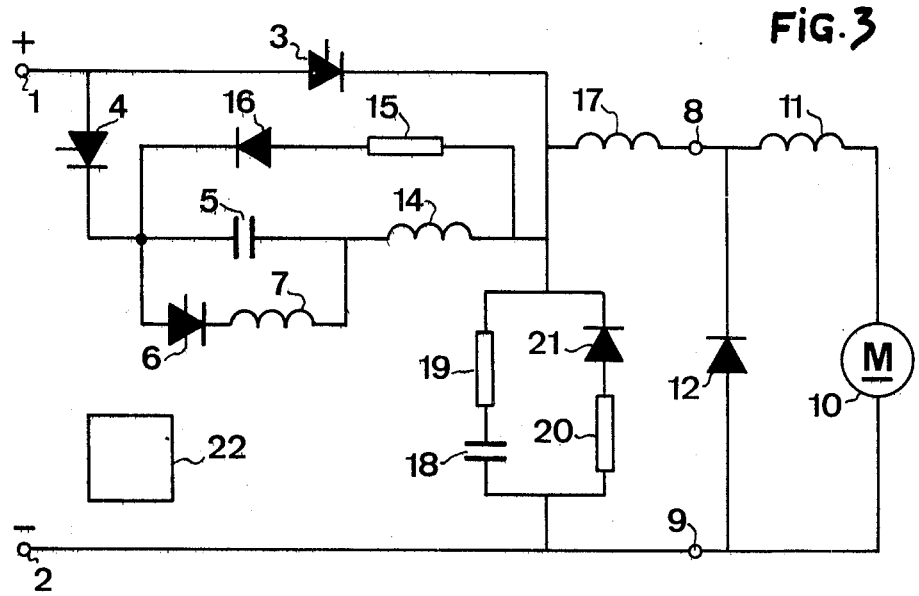
FIG. 3 shows a circuit diagram for a second embodiment.

FIG. 3 shows another manner in which the items of the chopper according to the invention can be arranged. All the elements of FIG. 2 reappear in FIG. 3 with the same references.

The only changes from FIG. 2 are as follows:

The circuit comprising the elements 5 - 7, 14 - 16 has been changed round with the thyristor 4, and the decoupling circuit 18 - 21 is connected up differently since the resistance 19 and the cathode of diode 21 are connected to the chopper output and not to the anode of thyristor 4.

However, the system shown in FIG. 3 operates in the same way as the system shown in FIG. 2, the only difference being in the individual values of the chokes, capacitors and resistances used. The control logic is the same in both cases.

This invention is of use more particularly for supplying rail vehicle traction motors.

An improvement in or relating to constant-frequency current choppers for low-rate supply of an inductive load, such choppers being embodied inter alia by a main thyristor shunted by a cut-off thyristor in series with a cut-off capacitor, the same being shunted by a charge-reversing circuit, characterised in that the chopper also comprises:

A first inductance connected in series with the chopper part comprising the cut-off capacitor and associated charge-reversing circuit;

A capacitor-discharing circuit comprising a first resistance in series with a first diode and connected across the previous system, the first diode being of opposite polarity to the cut-off thyristor;

A second inductance disposed in the chopper output connection;

A decoupling circuit comprising two parallel branches, one branch comprising a capacitor in series with a second resistance, the other branch comprising a third resistance in series with a second diode, the decoupling circuit being connected between, on the one hand, the connection connecting the first inductance to the first resistance and, on the other hand, that terminal of the d.c. power supply for the chopper which is not connected to the chopper input, the second diode being of opposite polarity to the latter power supply;

A control logic which, when the inductive load current is required to be between a few percent and a few tens of percent of its rated value, turns on the cut-off thyristor during the conductive times of the first diode, the energy supplied to the inductive load being proportional to the time difference between the turning-on of the cut-off thyristor and the natural cut-off of the first diode, and which also, when the inductive load current is greater than the values just specified, turns the main thyristor on, then turns it off by turning the cut-off thyristor on, as is conventional in the control of current choppers.

We claim:

1. In a constant-frequency current chopper connected between a voltage source and a load for low-rate supply of such load and comprising: a main thyristor, shunted by a cutoff circuit including therein a cutoff thyristor in series connection with a cutoff capacitor in a resonating discharge circuit having a first thyristor, and a control circuit means for controlling conductivity of said main, cutoff and first thyristors, each thyristor herein or hereafter recited having anode, cathode and gate terminals, said chopper being connected between a first terminal of said voltage source and said load, the improvement comprising:

a. additional discharge means for discharging said cutoff capacitor, said additional discharge means being connected across said cutoff capacitor, and b. decoupling means connected between said chopper and a second terminal of said voltage source for preventing excessively rapid variation of voltages applied to said thyristors, c. wherein said control circuit means provides low current values to said load by providing for conductivity of said cutoff thyristor during a time when said additional discharge means is discharging said cutoff capacitor, d. wherein said control circuit means provides increased current to said load by providing for said conductivity of said cutoff thyristor at earlier times during said discharge of said cutoff capacitor by said additional discharge means, and e. wherein said control circuit means provides larger current values to said load by providing for conductivity of said main thyristor prior to providing for conductivity of said cutoff thyristor.

2. Apparatus as recited in claim 1 further comprising a first inductance connected between said cutoff capacitor and said additional discharge means, and wherein said additional discharge means comprises:

a. first diode means, and b. first resistance means connected in series with said first diode means.

3. Apparatus as recited in claim 2 further comprising second inductance means receiving the chopper output current from said main thyristor.

4. Apparatus as recited in claim 3 wherein said decoupling means comprises first and second parallel branches, a. said first decoupling means branch comprising:
  i. second diode means and
  ii. second resistances means connected in series with said second diode means, and b. said second decoupling means branch comprises:
  i. third resistance means and
  ii. capacitance means connected in series with said third resistance means.

5. Apparatus as recited in claim 4 wherein said main and cutoff thyristors and said first diode means form a loop with said first resistance means, said cutoff thyristor means being oppositely poled to said main thyristor and said first diode means.

6. Apparatus as recited in claim 5 wherein said decoupling means is connected to a junction formed by said first inductance and said additional discharge means.

7. Apparatus as recited in claim 6 wherein said main and cutoff thyristors form a junction at their cathode terminals, said junction also including connection to said second inductance means, said decoupling means being connected to the anode of said cutoff thyristor.

8. Apparatus as recited in claim 6 wherein said main and cutoff thyristors form a junction at their anode terminals, said junction being connected to said first terminal of said voltage source, said decoupling means being connected to the cathode of said main thyristor.

9. Apparatus as recited in claim 6 further comprising a third diode means connected across said load, between said second inductor and said second terminal of said voltage source.

10. A method for controlling current delivered by a constant frequency current chopper to an inductive load comprising the steps of:

a. causing a thyristor in a resonating discharge circuit for a cutoff capacitor to enter a conductive state at a first point in time;

b. causing a diode in an additional discharge circuit across said cutoff capacitor to enter a conductive state at a second, subsequent point in time when the voltage across said cutoff capacitor has changed by a predetermined amount;

c. causing said thyristor in said resonating discharge circuit to terminate its conducting state at a still subsequent, third point in time;

d. causing said diode in said additional discharge circuit to terminate conductance at a still further, fourth point in time, and e. obtaining low current for said load by causing a cutoff thyristor to turn on at a point in time between said second and said fourth points in time when said diode in said additional discharge circuit is in its conducting state, f. decreasing said low current supplied to said motor by causing said cutoff thyristor to turn on at a point approaching said fourth point in time.

11. A method as recited in claim 10 wherein higher currents are provided to said load by including the steps of:

a. causing said cutoff thyristor to enter a conducting state at said second point in time, and b. causing a main thyristor to enter a conducting state at a point in time between said first and second points in time, increasing the current to said load by causing said main thyristor to enter its conductive state at a time approaching said first point in time.

* * * * *